Oct. 20, 1964     L. C. NEUFELD ETAL     3,153,253
SELECTIVE ACTUATING LINKAGE FOR WINDSHIELD WIPER MOTOR
Filed May 22, 1963
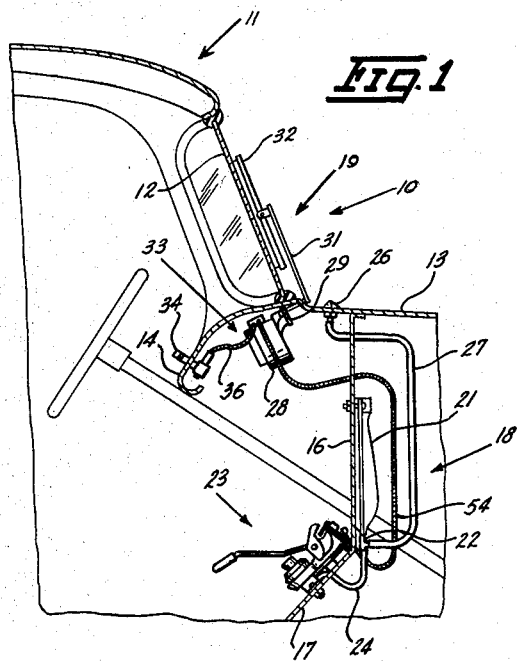
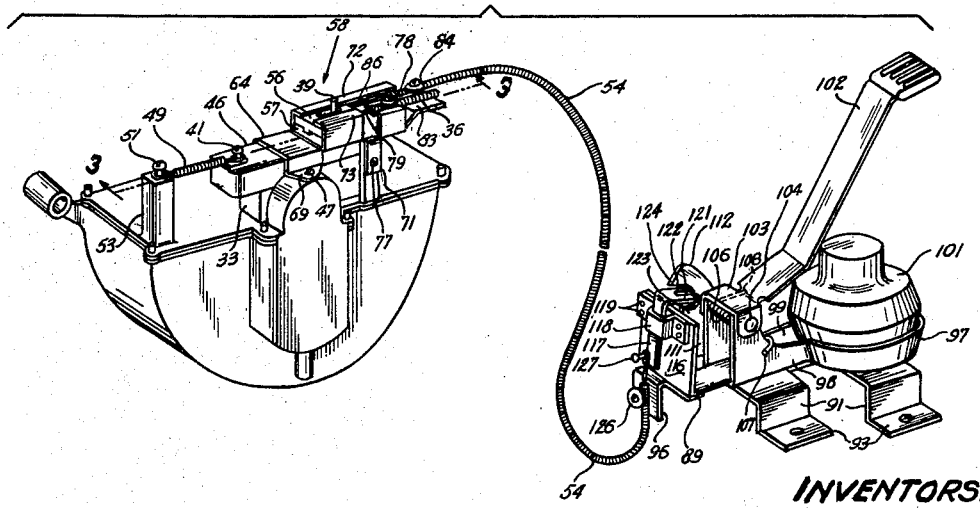
INVENTORS.
LEONARD C. NEUFELD
ALFRED H. SCHMALFELDT
BY *Rudolph L. Powell*
ATTORNEY.

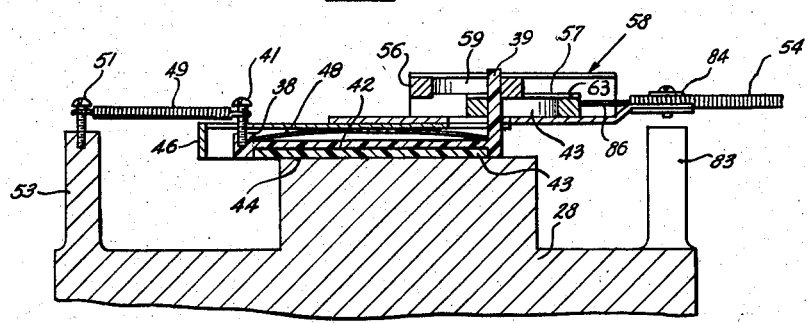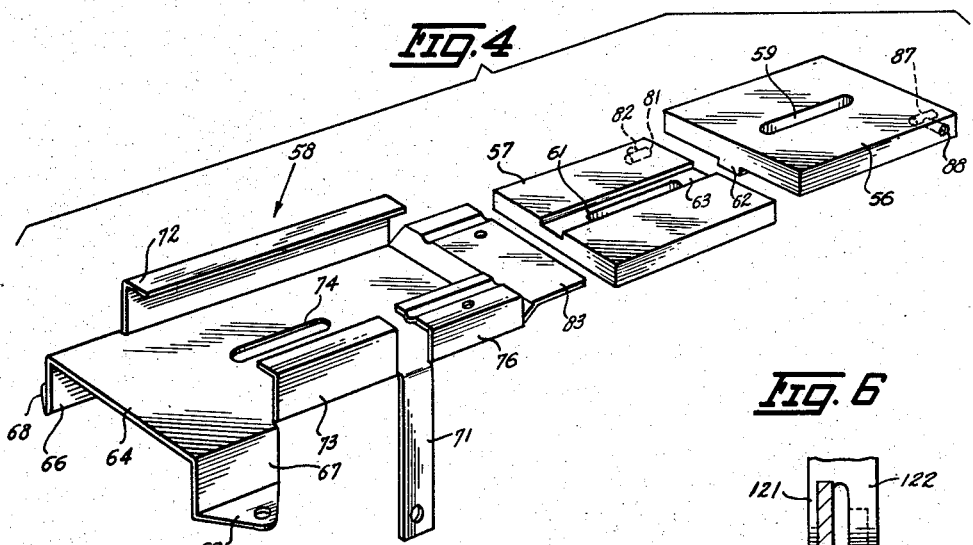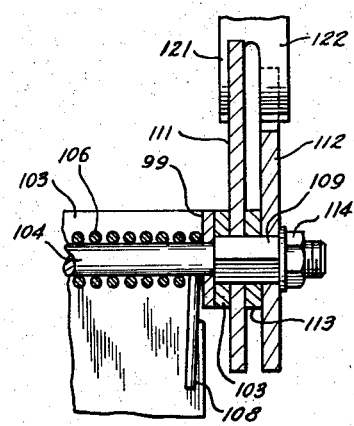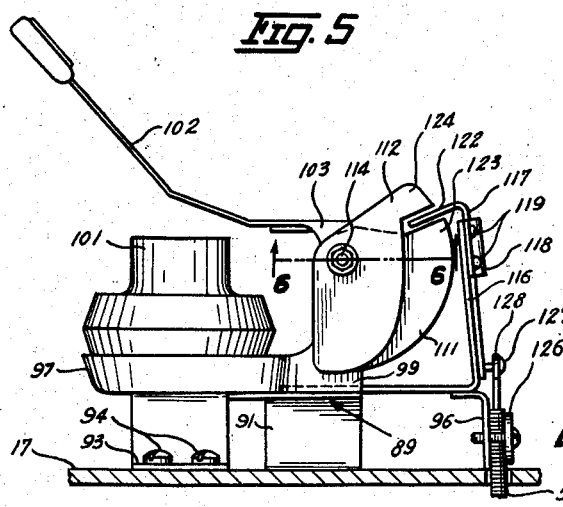

United States Patent Office 3,153,253
Patented Oct. 20, 1964

3,153,253
SELECTIVE ACTUATING LINKAGE FOR
WINDSHIELD WIPER MOTOR
Leonard C. Neufeld and Alfred H. Schmalfeldt, Des
Moines, Iowa, assignors to The Delman Company,
Cookeville, Tenn., a corporation of Tennessee
Filed May 22, 1963, Ser. No. 282,422
8 Claims. (Cl. 15—250.02)

This invention relates to vehicle windshield clearing systems and more particularly to an actuating linkage for the wiper unit providing for the concurrent operation of the wiper and washer units, or for the operation of the wiper unit alone.

The object of the invention is to provide an improved actuating linkage for a wiper motor of a windshield clearing system.

Another object of the invention is to provide a simplified actuating linkage for a vehicle windshield wiper motor adapted to selectively move the motor control means in response to either a hand control or a foot operated washer unit.

A further object of the invention is to provide in a windshield clearing system a coordinating linkage which automatically operates the wiper motor control in response to actuation of the washer unit.

Still another object of the invention is to provide plural operators for a windshield wiper motor which are effective to control the wiper motor in a proper manner regardless of which operator is actuated.

An additional object of the invention is to provide in a windshield clearing system a wiper motor actuating linkage formed from a minimum number of parts, which is of a simple and compact construction, economical in cost and installation, and efficient in operation.

The exact nature of the invention as well as other objects and advantages thereof will be readily apparent from the consideration of the following specification relating to the accompanying drawing wherein:

FIG. 1 is a fragmentary side elevation sectional view of a vehicle showing the assembly therewith of a windshield clearing system embodying the selective actuating linkage for the wiper motor means;

FIG. 2 is an enlarged perspective view of the wiper motor means and foot pump assembly of FIG. 1 showing the motor control mechanism in assembled relation with the dual actuating linkage therefor;

FIG. 3 is a sectional view taken along the line 3—3 of FIG. 2 showing the valve control member held in an on position by one movable block;

FIG. 4 is an exploded perspective view of the selective actuating linkage for the wiper motor means;

FIG. 5 is a side elevation view of the foot pump assembly of FIG. 2; and

FIG. 6 is an enlarged sectional view taken along the line 6—6 of FIG. 5 and viewed looking toward the right in FIG. 5.

Referring to the drawing, there is shown in FIG. 1 a windshield clearing system, indicated generally by the number 10, in assembled relation with a vehicle generally indicated in fragmentary form at 11. The vehicle 11 is illustrated as having a windshield 12, an engine cowl 13 extended forwardly of the windshield, and an instrument panel or dashboard 14 positioned below and rearwardly of the windshield. A fire wall 16 extends downwardly from the cowl 13 and terminates in an inclined toe board 17.

The windshield clearing system 10 includes a washer unit and a wiper unit designated generally as 18 and 19, respectively. The washer unit 18 can be concurrently operated with the wiper unit 19 or separately operated for clearing the windshield 12 of foreign materials that are deposited on the outside surface of the windshield.

The windshield washer unit 18 includes a flexible bag-type fluid container or reservoir 21 mounted on the forward side of the fire wall 16. A pair of one-way valves 22 are connected in fluid communication with the bottom of the reservoir 21. A fluid line or hose 24 connects the valves 22 to a foot operated pump assembly 23. Mounted on the cowl 13 forward of the windshield 12 is a nozzle 26 which functions to direct cleaning fluid onto the windshield. A fluid line or hose 27 provides a fluid passage from the valves 22 to the nozzle 26. Upon operation of the foot pump assembly 23 fluid is displaced from the pump and forced through the hose 24 into the valves 22. The valves 22 check the flow of fluid into the reservoir 21 and permit the flow of fluid into the hose 27 for discharge through the nozzle 26 onto the windshield 12.

The wiper unit 19 includes a motor means 28, such as a vacuum or electric operated motor, mounted on the vehicle frame below the windshield 12. The motor 28 is connected by means of a motion transmitting assembly 29 to a windshield wiper assembly which comprises an arm 31 and a wiper blade 32 which is connected to the upper end of the arm 31 and engageable with the windshield 12. When the motor 28 is energized the wiper blade 32 oscillates over the windshield 12.

The motor 28 is connected and disconnected with a source of power by means of a control mechanism 33 which may be actuated by a hand control 34 mounted on the dashboard 14 or actuated in response to operation of the foot pump 23 in a manner to be described. The hand control 34 is coupled to the control mechanism 33 by means of a Bowden cable 36, and is manipulated to move the control mechanism 33 to an adjusted position.

As shown in FIGS. 2 and 3, the control mechanism 33 comprises a reciprocally movable valve control member 38 which has an upwardly extended leg 39 at one end thereof and an upwardly extended screw 41 threaded into its opposite end. The bottom side of the control member 38 is formed with a rectangular-shaped recess 42 into which is seated a slide valve body 43. The valve body 43 slides on a substantially flat surface 44 on the top section of the motor 28 and functions to connect the motor means 28 with a source of energy, such as a vacuum pressure. The control member 38 and the valve body 43 is guided in an elongated path over the flat surface 44 by means of a housing or casing 46 which is secured to the top of the motor 28 by means of screws 47. A bowed spring 48 interposed between the control member 38 and the top wall of the housing 46 biases the valve body 43 into engagement with the flat surface 44 to provide a seal between the mating surfaces of the valve body 43 and the top section of the motor 28.

The control member 38 is biased to an off position by means of a tension spring 49 which is connected to the upright screw 41 and a longitudinally spaced screw 51. An upwardly extended boss 53 connects the screw 51 to the motor 28 in alignment with the control member 38.

The control member 38 is connected to the Bowden cable 36 and a second Bowden cable 54 by means of a pair of stacked blocks 56 and 57 which are mounted in a guide 58 for relative slidable movement in a direction longitudinal of the control member 38. As shown in FIG. 4, each block 56 and 57 is of a rectangular shape and is provided with aligned longitudinally extended slots 59 and 61, respectively. The bottom wall of the top block 56 is provided with a tongue 62 which is positioned at the mid-section of the block and extends longitudinally thereof. The tongue 62 extends into a complementary groove 63 formed in the top surface of the bottom block 57. This tongue and groove connection between the top and bottom blocks prevents relative lateral and rotational movement of one block with respect to the other block.

The guide 58 is a one-piece stamping which has a flat base 64, downwardly extending legs 66 and 67 which have lateral toe sections 68 and 69, and a downwardly directed ear 71. Integrally formed with the opposite sides of the flat base 74 are inverted facing L-shaped arms 72 and 73 which extend forwardly to form with the base 64 guideways for the blocks 56 and 57. The mid-section of the base 64 has a longitudinally extended slot 74 which conforms in size and shape to the slots 59 and 61 in the blocks 56 and 57, respectively. An inverted L-shaped support 76 extends upwardly from the side of the base 64 forward of the ear 71 and forms a stationary platform for the sheath of Bowden cable 36.

The blocks 56 and 57 are shown in assembled relation with the guide 58 in FIGS. 2 and 3. The guide 58 is positioned over the casing 46 with the leg 39 of the control member 38 extended through the slot 74. In this position the screws 47 projected through the toe sections 68 and 69 and a screw projected through the ear 71 fasten the guide 58 to the motor 28. The blocks 56 and 57 are guidably disposed within the L-shaped arms 72 and 73 with the leg 39 of the control member 38 projected through the slots 59 and 61.

The Bowden cable 36 from the hand control 34 is fastened to the top of the L-shaped support 76 by means of a clamp 78. The wire 79 of the cable 36 extends into a hole 87 in the front wall of the block 56 and is fastened to the block by means of a transverse friction screw 88.

The Bowden cable 54, which connects the foot pump 23 with the control mechanism 33 of the motor 28, is fastened to an upwardly stepped lip 83 integral with the base 64 of the guide 58 by means of a clamp washer 84. The wire 86 of the Bowden cable 54 extends into a hole 81 in the forward end wall of the block 57 and is fastened to the block by means of a transverse friction screw 82.

The foot pump assembly 23, as shown in FIGS. 2 and 5, comprises a support member 89 having legs 91 formed with lateral extensions 93. Bolts 94 extended through the lateral extensions 93 secure the support to the toe board 17. An ear 96 which extends toward the toe board 17 and forms a stationary platform for the Bowden cable 54 is secured to the support 89 by an L-shaped bracket 116. A cup-shaped housing 97 is secured in back-to-back relationship to the support 89 and includes a pair of arms 98 and 99 that extend outward from the toe board 17. A collapsible hollow body member 101, positioned on the cup-shaped housing 97, is connected to the hose 24. The body member 101 is compressed to a collapsed position by a foot lever 102 which has a U-shaped head 103 pivotally mounted on the laterally spaced arms 98 and 99 by means of a pin 104. The foot lever 102 is drivably connected to the pin 104 and is rotated to a normal non-operating position by means of a torsion spring 106 which is positioned concentrically about the pin 104 and has a hook end 107 extended over the arm 98 and a straight end 108 in engagement with the lever 102.

Referring to FIG. 6, the pin 104 has an axial extension 109 which is non-circular in cross section and drivably connected to the head 103 of the lever 102 so that the angular movement of the lever will rotate the pin 104. A pair of cams 111 and 112 are mounted on the axial extension 109 and are spaced from each other by a spacer 113. A nut 114 threaded on the end of the extension 109 holds the cams 111 and 112 in assembled relationship with the axial extension 109 of the pin 104.

A bracket 116 secured to the support 89 extends over the cams 111 and 112 and positions a slide 117 in the plane of the cams. The slide 117 is movably retained on the bracket 116 by an offset plate 118 which is fastened to the top of the bracket 116 by means of screws 119. Integrally formed with the forward end of the slide 117 are a pair of spaced fingers 121 and 122 which extend in a downward direction adjacent the cams 111 and 112. A lip section 123 of the cam 111 is engageable with the inside surface of the finger 121 to move the finger in an outward direction. The cam 112 has a lip section 124 which extends in an upward direction and engages the outside surface of the finger 122 and functions to move the slide 117 back toward the toe board 17.

The sheath of the Bowden cable 54 is clamped on the ear 96 by means of a screw and washer 126. A screw 127 secured to the slide 117 connects the wire 128 of the Bowden cable 54 to the slide 117.

In the operation of the windshield clearing system, assume that it is desired to operate the washer unit 18 and the wiper unit 19 concurrently to clean the windshield 12. The vehicle driver places his foot on the foot lever 102 of the pump assembly 23 and exerts downward pressure thereon so as to move the lever 102 toward the toe board 17. Initial movement of the lever 102 operates the control member 38 to start the wiper motor before cleaning fluid is discharged onto the windshield 12. Further movement of the lever 102 collapses the hollow body member 101 forcing the fluid therein through the fluid line 24, one of the valves 22, and the fluid line 27 to the discharge nozzle 26, from which fluid is expelled as streams of liquid onto the windshield 12. The hollow body member may be successively pumped without affecting the control member 38 because the cam 111 moves out of driving engagement with the finger 121.

As best appears in FIGS. 2 and 5, on movement of the foot lever 102 toward the toe board section 17 prior to engagement with the body member 101 the cam 111 is rotated in a counterclockwise direction engaging the lip section thereof with the finger 121 thereby moving the slide 117 away from the toe board 17. This movement of the slide 117 pulls the wire 86 through the sheath of the Bowden cable 54, as shown in FIG. 2, moving the top block 56 into engagement with the leg 39 of the control member 38. Further movement of the block 56 carries the control member 38 to its on or valve opening position to thereby start the motor 28 in operation. As a result, the wiper blade 32 oscillates before washing fluid is directed onto the windshield 12. Movement of the wire 86 in this manner does not affect the hand control 34 because of the slot 61 in the bottom block 57 which provides a lost motion connection between the block 57 and the leg 39 of the control member 38. Thus the concurrent operation of the washer and wiper units is independent of the separate operation of the wiper unit.

When the driver of the vehicle removes the foot pressure from the lever 102 the torsion spring 106 rotates the lever back to its initial position. The rotating lever moves the lip section of the cam 112 into engagement with the finger 122 of the slide 117 and pushes the slide back toward the toe board 17. This reverse movement of the slide 117 moves the Bowden cable wire 86 back into its sheath thereby moving the top block 56 in the guide channels formed by the L-shaped arms 72 and 73 out of engagement with the leg 39. With the holding force of the block released the spring 49 pulls the control member 38 back to its initial off position thereby terminating the operation of the motor 28.

Now assume that it is merely desired to operate the windshield wiper unit 19, without any operation of the washer unit 18. The knob on the hand control 34 mounted on the dashboard 14 is pulled to move the wire 79 of the Bowden cable 36 away from the motor 28. This movement of the wire carries the bottom block 57 forward in the guide formed by the L-shaped arms 72 and 73 to form a driving connection between the block 57 and the upright leg 39 of the control member 38. In this position movement of the block 57 in the forward direction carries the control member 38 to its on position thereby operating the motor 28 independent of the washer unit 18. The hand control 34 holds the wire in its adjusted position until the knob of the hand control 34 is forced back toward the dash 14. The reverse movement of the hand control knob moves the bottom block 57 in a reverse direction breaking the drive coupling between the block 57 and the leg 39. When the holding action of the block 56 is removed from the leg 39 the tension spring 49 pulls the control member 38 back to its initial off position thereby terminating the operation of the wiper motor 28.

In summary it can be seen from the above description that the control mechanism 33 for the motor 28 may be actuated in response to either the manipulation of the foot pump assembly 23 or the conventional manual control 34 mounted on the vehicle dash 14. The windshield wiper blade 32 can thus be operated independently of or in conjunction with the washer unit 18 depending on driving conditions. The reciprocating blocks 56 and 57 provide a quick and positive actuating linkage which is operable to selectively control the on position of the control member 38. This linkage arrangement enables the windshield wiper motor 28 to be energized substantially immediately on the operation of the foot pump assembly 23 of the washer unit 18. When the actuating force is removed from the foot pump assembly 23 the motor 28 is automatically turned off.

Although the invention has been described with respect to a preferred embodiment thereof, it is to be understood that it is not to be so limited, since changes can be made therein which are within the full intended scope of this invention as defined in the appended claims.

We claim:
1. A windshield clearing system for a vehicle having a windshield and a source of energy comprising:
   (a) a windshield wiper unit including a wiper blade in engagement with the windshield,
   (b) motor means connected to said wiper blade and operable to oscillate the wiper blade on the windshield,
   (c) a control mechanism for said motor means including a valve member having an upright leg and movable to an on and off position for connecting and disconnecting said motor means with said source of energy,
   (d) a windshield washer unit including a nozzle and a foot pump assembly for supplying fluid under pressure to said nozzle which dispenses fluid onto the windshield in the path of the oscillating wiper blade,
   (e) a first block having an elongated slot,
   (f) a second block having an elongated slot,
   (g) guide means slidably mounting the first and second blocks on the control mechanism for movement in an elongated path with the slots extended parallel to said elongated path and with the upright leg extended through said slots,
   (h) a first operator actuated means connected to said first block and operative to move said first block in said elongated path into engagement with the upright leg to carry the valve member to the on position, and
   (i) second operator actuated means connected to said foot pump assembly and said second block and responsive to operation of said pump assembly to move said second block in said elongated path into engagement with the upright leg to carry the valve to the on position.

2. The windshield clearing system defined in claim 1 wherein the foot pump assembly includes,
   (a) a rotatable lever,
   (b) a first cam operatively connected to said lever and rotatable by said lever to operate said second actuated means moving said second block in one direction independent of said first block, and
   (c) a second cam operatively connected to said lever and rotatable by said lever to operate said second actuated means moving said second block in a direction opposite said one direction independent of said first block.

3. In a windshield clearing system including wiper motor means and a source of energy,
   (a) a control mechanism for said wiper motor means, said control mechanism having an actuating member formed with an upright leg and movable to an on and off position for connecting and disconnecting said motor means with said source of energy,
   (b) a first block having an elongated slot,
   (c) a second block having an elongated slot,
   (d) guide means slidably mounting the first and second blocks on the control mechanism for movement in an elongated path with the slots extended parallel to said elongated path and with the upright leg extended through said slots in the first and second blocks,
   (e) first means connected to said first block and operative to move said first block in said elongated path into engagement with the upright leg to carry the actuating member to the on position, and
   (f) second means connected to said second block and operative to move said second block in said elongated path into engagement with the upright leg to carry the actuating member to the on position independent of said first means.

4. In a windshield clearing system as defined in claim 3 including,
   (a) means for biasing the valve member to the off position.

5. In a windshield clearing system including wiper motor means and a source of energy,
   (a) a control mechanism for said wiper motor means, said control mechanism having a valve member movable to an on and off position for connecting and disconnecting said motor means with said source of energy,
   (b) a first block means operatively connected to said valve member,
   (c) a second block means operatively connected to said valve member independent of said first block means,
   (d) guide means slidably mounting the first and second block means on the control mechanism for movement in an elongated path,
   (e) first means connected to said first block means and operative to move said first block means in an elongated path to carry the valve member to the on position, and
   (f) second means connected to said second block means and operative to move said second block means in an elongated path to carry the valve member to the on position independent of said first means.

6. Linkage means for a motor having a movable control member having an upright leg and operable to connect the motor with a source of energy comprising,
   (a) a first block having an elongated slot,
   (b) a second block having an elongated slot,
   (c) guide means mounting the first and second blocks for movement in an elongated path with the slots extended substantially parallel to said elongated path and with the upright leg extended through said slots,
   (d) first means connected to said first block and operative to move said first block in said elongated path engaging the upright leg for carrying the control member to the on position, and
   (e) second means connected to said second block and operative to move said second block in said elongated path engaging the upright leg for carrying the control member to the on position independent of said first means.

7. Linkage means for a motor having a movable control member including an upright leg and movable to an on and off position for connecting and disconnecting the motor with a source of energy comprising:
   (a) a plurality of block members, each of said block members having an elongated slot, (b) guide means mounting said block members for movement in an elongated path with the slots extended substantially parallel to said elongated path and with the upright leg extended through said slots,
(c) first means connected to at least one of said block members and operative to move said one block member in said elongated path engaging the upright leg for carrying the control member to the on position, and
(d) second means connected to another of said block members and operative to move said other block member in said elongated path engaging the upright leg for carrying the control member to the on position independent of said one block member.

8. The windshield clearing system defined in claim 1 wherein the foot pump assembly includes:
(a) a rotatable lever,
(b) slide means movable in an elongated path in response to rotation of said lever,
(c) a first cam operatively connected to said lever and rotatable by said lever to engage said slide means to move said slide means in one direction,
(d) a second cam operatively connected to said lever and rotatable by said lever to engage said slide means to move said slide means in a direction opposite to said one direction, and
(e) means operatively connecting the slide means with the second block to move said valve member to the on position when the slide means is moved in said one direction and to the off position when the slide means is moved in said opposite direction.

References Cited in the file of this patent
UNITED STATES PATENTS

| | | |
|---|---|---|
| 2,869,164 | Neufeld | Jan. 20, 1959 |
| 2,873,467 | Oishei | Feb. 17, 1959 |